United States Patent
McPherson

(10) Patent No.: US 8,480,802 B2
(45) Date of Patent: *Jul. 9, 2013

(54) CEMENTITIOUS COMPOSITION INCORPORATING HIGH LEVELS OF GLASS AGGREGATE FOR PRODUCING SOLID SURFACES

(75) Inventor: Donald Martin McPherson, Oakland, CA (US)

(73) Assignee: Polycor Vetrazzo, Inc., Tate, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/424,113

(22) Filed: Mar. 19, 2012

(65) Prior Publication Data

US 2012/0234208 A1    Sep. 20, 2012

Related U.S. Application Data

(60) Continuation of application No. 13/209,225, filed on Aug. 12, 2011, now Pat. No. 8,137,454, which is a continuation of application No. 12/842,031, filed on Jul. 23, 2010, which is a division of application No. 11/218,343, filed on Aug. 31, 2005, now Pat. No. 7,771,529.

(60) Provisional application No. 60/606,402, filed on Aug. 31, 2004.

(51) Int. Cl.
*C04B 14/22* (2006.01)

(52) U.S. Cl.
USPC .......................... 106/716; 106/718; 106/737

(58) Field of Classification Search
USPC .......................... 106/716, 718, 737
See application file for complete search history.

(56) References Cited

U.S. PATENT DOCUMENTS 8,137,454 B2 * 3/2012 McPherson ............... 106/716

* cited by examiner

*Primary Examiner* — Paul Marcantoni
(74) *Attorney, Agent, or Firm* — Donald L. Beeson; Beeson Skinner Beverly, LLP

(57) ABSTRACT

A cementitious compostion for high density, low porosity sheet-form building materials having solid surfaces is comprised of cement, pozzolans, and a high percentage of fine and/or coarse glass aggregate.

24 Claims, 2 Drawing Sheets

Cement efficiency as a function of cement content. [P/Cm] = 1.0.

Bulk density as a function of cement content. [P/Cm] = 1.0.

Absorption and porosity as a function of cement content. [P/Cm] = 1.0 series.

CEMENTITIOUS COMPOSITION INCORPORATING HIGH LEVELS OF GLASS AGGREGATE FOR PRODUCING SOLID SURFACES

CROSS-REFERENCE TO RELATED APPLICATIONS

This application claims benefit to and is a continuation application of U.S. patent application Ser. No. 13/209,225, which was filed Aug. 12, 2011, which is a continuation of U.S. patent application Ser. No. 12/842,031, which was filed on Jul. 23, 2010, which is a divisional application of U.S. application Ser. No. 11/218,343, which was filed on Aug. 31, 2005 and is now U.S. Pat. No. 7,771,529. U.S. application Ser. No. 11/218,343 also claims benefit to U.S. Provisional Application No. 60/606,402, which was filed on Aug. 31, 2004, now expired. Each of the above-identified applications is hereby incorporated by reference as if recited in full herein.

BACKGROUND OF THE INVENTION

The present invention generally relates to sheet-form building materials, and more particularly relates to cementitious sheet-form materials having an exposed solid surface that is often intended to satisfy desired aesthetic requirements. The invention is particularly adapted to producing cementitious sheet-form materials having high recycled materials content, and especially a high content of recycled glass. However, the invention is not limited to the use of recycled materials.

Cementitious sheet-form building materials or panels that provide solid surfaces have a wide variety of applications, such as use for counter-tops, table-tops, shower pans, floors, walls and the like. Such panels are conventionally fabricated with a high cement content using an aggregate, such as rock or crushed marble, and normally have a thickness of at least one inch (2.54 cm) and a maximum thickness limited by weight considerations. A suitable solid surface panel should have certain mechanical, thermal, and chemical properties, as well being capable of meeting certain aesthetic criteria. For example, a sheet material measuring 300cm×50cm×3cm thick should have a compressive strength in excess of 40 KPa and a tensile strength greater than 7.5 KPa. Furthermore, for thermal and chemical stability the material should have a high thermal shock resistance, porosity less than 1%, hydraulic permeability less than 1% and a pH less than 10.0. In addition, it is desirable to have a controllable brightness coefficient.

There is a large and growing market for solid surface sheet-form material that have a high recycled content. Such recycled content can most suitably be provided, at least in large part, in the form of recycled glass. However, the difficulty with substituting glass for sand or aggregate in this application is that glass normally results in the loss or degradation of the mechanical and chemical properties needed for solid surface panels. The present invention overcomes the drawbacks of using glass in this application by providing a new cementitious composition and method for making a solid surface building panel that has a high percentage of glass, but which achieves the mechanical, chemical and thermal properties required of such panels. The composition and method of the invention are particularly suited to providing a solid surface panel having a high content of recycled material, and generally a recycle content of at least 60%.

Cementitious and non-cementitious compositions having a glass or recycled component are known, but none are capable of providing a practical sheet form material having a solid surface with the desirable properties described above. U.S. Pat. No. 4,440,576 to Flannery et al. describes hydraulic cements prepared from oxides, which were melted to form a glass, quenched and subsequently ground to a fine size. This process of melting an assemblage of oxides, cooling the melt and subsequently grinding to a fine particle size is virtually identical to the process by which ordinary Portland cement (OPC) is prepared. While the cementitious composition disclosed in Flannery et al can achieve relatively high strengths, it would be expensive to manufacture. Moreover, Flannery et al. does not disclose to use an aggregate in its composition.

It is also known that recycled glass and fly ash, two products recovered from a waste stream, can be alkali activated, typically with alkali silicate solutions, mixed with additional water to provide the proper rheology, cast into molds and cured at between 40-120° C. for between 2-18 h, to make cements with very high compressive strengths. The resulting strengths of these mortars and concretes range from 63-104 MPa for the fly ash systems (U.S. Pat. No. 5,601,643 Silverstrim, et al.), and as high as 92 MPa for the recycled glass systems for producing artificial stone (U.S. Pat. No. 6,296,699 Jin).

U.S. Pat. No. 6,749,679 to Shi discloses to utilize finely divided glass powder plus fly ash, polymerized with sodium silicate plus a lime source (either CaO, OPC or GGBFS). These cements and mortars have moderately high strengths and good acid resistance due to the high degree of polymerization of the silica anions and the high silica content of the system.

More typically, recycled glass with a surface greater than 300 $m^2$/kg has been used as a traditional pozzolan cement additive, or more recently as an inter-ground additive to cement clinker. With the addition of finely divided glass to act as a cement or cement modifier, there is no penalty, with actual benefits reported in strength gain, lowered hydraulic permeability and greater bond strength.

When recycled glass is incorporated into a cement system as a pozzolan, either as a replacement or addition to the existing cement load, there is an enhancement of properties. In fact high strength mixes can be made using conventional curing cycles by using a moderate amount of glass pozzolan in conjunction with micro silica.

In one study (The Waste and Resources Programme "WRAP", CONGLASSCRETE II, Final Report, March, 2004), 30% of the OPC was replaced by recycled glass pozzolan with a surface area greater than 300 $m^2$/kg. In the same study recycled glass was added as a pozzolan and as a fine and coarse aggregate replacement for a total recycle glass content ranging between 24-53%. Table I below provides compositions and compressive strengths of these known concrete systems which use recycled glass as a pozzolan as well as an aggregate. The samples are ranked in Table I in descending order beginning with the highest pozzolan/cement ratio and lowest W/Cm ratio. What is noteworthy is the high 28-day strengths obtained with low cement levels. Samples 6 and 7 have high pozzolan to cement ratios, satisfactory 28-day strengths but low recycled content.

TABLE I (WRAP)
Reported compositions of pozzolan glass addition to OPC and
the resulting 28-day compressive strengths.

| Sample Number | Cement [%] | GP + MS [%] | (GP + MS)/Cement | W/Cm | $f_c^{28}$ [Mpa] |
|---|---|---|---|---|---|
| 1 | 12.0 | 1.30 | 0.11 | .400 | 75.2 |
| 2 | 12.0 | 1.30 | 0.11 | .552 | 54.0 |
| 3 | 12.0 | 1.30 | 0.11 | .567 | 46.5 |
| 4 | 10.0 | 3.30 | 0.33 | .447 | 43.0 |
| 5 | 10.0 | 3.30 | 0.33 | .550 | 38.5 |
| 6 | 6.65 | 6.65 | 1.00 | .553 | 24.2 |
| 7 | 6.65 | 3.30 | 0.50 | .493 | 49.5 |

GP = glass pozzolan with a surface area >300 m²/kg.
MS = micro-silica.
W/Cm = mix water to cement ratio.
(GP + MS)/Cement = the pozzolan plus filler to cement ratio.
The aggregate (fine and coarse), is conventional.

In U.S. Pat. No. 6,645,289 to Sobolev, there is disclosed an inter-ground cement clinker with gypsum, GGBFS, fly ash, pozzolanic glass powder and an admixture comprising a HRWR, a polymer and finely divided silica. In one example, $f_c^{28}$=180 MPa concrete was prepared with 14.5% ordinary Portland cement, 33% pozzolans comprising gypsum, zeolite fines and glass fines, using a W/Cm=0.15. Good strength is achieved with low cement content.

U.S. Pat. No. 5,531,823 to Breton describes a high-strength, low pH, low permeability concrete formed using very low cement content. This is made possible by incorporating high percentages of silica fume and silica flour to give a pozzolan-cement ratio of up to 3. The W/Cm ratio (0.947), is very high for a high-strength mix. The $f_c^{28}$=85 MPa, and the long-term pH is around 9.6. There is uncertainty how the excess mix water is incorporated because the final product is of low permeability. If the water simply evaporates, as the authors suggest, then the final concrete would have a high hydraulic permeability due to the resulting microscopic voids. It is hypothesized that the silica fume is incorporated into the gel phase, reacting with CH to form CHS (Tobermorite). Breton does not disclose a composition that uses glass.

In U.S. Pat. No. 4,505,753 (Scheetz, et al.) high-strength compositions are disclosed with low pH developed by incorporating 40-60% ordinary Portland cement, 5-20% silica fume, and up to 40% finely divided crystalline filler material. The high silica percentage is responsible for the lowered pH. The product requires steam curing.

U.S. Pat. No. 6,080,234 to Clavaud et al. discloses a high performance concretes based on low cement content, by optimizing the uniformity of the particle size distribution from about 0.01 pm to 5 cm. High strengths of more than 150 Mpa are obtained from mixes with 3-15% of either ordinary Portland cement or high alumina cement, but only after heat-treatments in excess of 200° C.

An unfulfilled need exists for a cementitious composition that has a relatively high glass content, that supports a relatively high content of recycled materials and particularly recycled glass, and that will exhibit the proper set of attributes for a solid surface sheet-form building material, such as excellent mechanical properties, low porosity and hydraulic permeability, pH neutrality and controllable brightness.

SUMMARY OF THE INVENTION

The present invention is directed to a cementitious composition for high density, low porosity sheet-form building materials that can be used to provide exposed solid surfaces, for example, surfaces for shower walls and floors, countertops, table-tops, and the like, where low hydraulic permeability and high compressive and tensile strength is desired. The invention also is directed at a method of producing such sheet-form products from the cementitious composition of the invention. In addition to low hydraulic permeability and high compressive and tensile strength, sheet-form products made in accordance with the invention will advantageously exhibit a moderate pH, high thermal shock resistance, and a controllable brightness coefficient. The composition of the invention is also particularly suited to a high content of recycled materials, particularly recycled glass.

The composition of the invention is based on three primary ingredients, namely, cement, pozzolans, and a high percentage of fine and/or coarse glass aggregate, preferably present in an amount which by weight is at least 60% of the composition. The cement content, which is suitably ordinary Portland cement (OPC) and preferably Type I or Type III OPC, but which could be other cements such as white cement, is relatively low, preferably in the range of about 3% to 20% by weight, and the pozzolan to cement ratio is relatively high, preferably equal to or greater than unity, but which can suitably be in the range from 0.25 to 4. In a preferred aspect of the invention, the composition incorporates a high percentage of recycled materials, including recycled glass in the form of the aggregate, sand and a portion of the pozzolan. The high pozzolan to cement ratio is necessary to permit the incorporation of high percentages of recycled glass.

The pozzolan component of the invention includes at least one, and preferably a combination of pozzolans, preferably selected from the following group of pozzolans: fly ash, silica fume, ground granulated blast furnace slag, metakaolin, wollastonite, micro silica, amorphous silica and finely divided glass powders. A most suitable combination of pozzolans will include metakaolin, wollastonite, micro silica, and finely divided glass powders. Other pozzolans can be added to achieve desired characteristics, such as color. A non-reactive silica-based filler component can optionally be added. The suitable mineral fillers are various forms and sizes of crystalline silica.

The mechanical, thermal, and chemical properties can be optimized when the pozzolan to cement ratio is in the range from 0.25 to 4. While cement content ranges between about 3% and 20% by weight are contemplated, the preferred content range for the cement component is about 5% to 10%. The resulting product is characterized by high compressive and tensile strength, high density, low hydraulic permeability, low porosity and moderate pH, high thermal shock resistance, controllable brightness coefficient and the ability to support a high recycled content. Product made using these compositions is suitable for both vertical and horizontal solid surfaces such as walls, floors, counters, tables, as well as suitable for high production fabrication of exposed-aggregate panels at least as large as 300 cm×150 cm at 3 mm thickness.

It is noted that the pozzolans in the composition of the invention increase moderate-age to long-term strength, and decrease hydraulic permeability, lower the pH and increase aggregate bonding. The optional fillers are added to increase strength and lower porosity and permeability by filling in the size range of particles missing from traditional ordinary Portland cement (or other cement) mixes. The chemical composition of OPC, and the pozzolans and fillers used in this invention are given in Table II. An effective pozzolan has a composition high in at least one of the main components in OPC, silica, calcia and alumina. Pozzolans also have surface areas equal to or greater than OPC, and are primarily amorphous.

reactive, silica-based filler component is optionally added. The suitable mineral filler materials are various forms and sizes of crystalline silica. The desired properties of the sheet-

TABLE II

Chemical composition, pH, color and particle size distribution of white Portland cement (WPC), fly ash (FA), metakaolin (MK), wollastonite (WO), ground granulated blast furnace slag (GGBFS), grey silica fume (GSF), white silica fume (WSF) and recycled glass pozzolan (RGP).

| Oxide | WPC | FA | MK | WO | GGBFS | GSF | WSF | RGP |
|---|---|---|---|---|---|---|---|---|
| CaO | 65.0 | 1-12 | 0.1 | 48.3 | 39 | 0.5-1 | | 9 |
| $SiO_2$ | 24.5 | 20-60 | 52-54 | 51.7 | 36 | 80-85 | 100 | 70 |
| $Al_2O_3$ | 5.9 | 5-35 | 42-44 | | 10 | 3-5 | | 1 |
| MgO | 1.1 | 0-5 | <0.1 | | 12 | 1-1.5 | | 3 |
| $FeO/FeO_3$ | 0.6 | 10-40 | <1 | | .5 | 1-2 | | .3-.4 |
| $Na_2O$ | | 0-4 | <0.05 | | | | | 13 |
| $K_2O$ | | 0-3 | <0.4 | | | | | .5 |
| S | 1.8 | 0-4 | <0.1 | | 1.4 | 1-1.5 | | |
| Other | | | <3($TiO_2$) | | 1 | | | |
| PH | 13.0 | 10.9 | 5.6 | 9.9 | 11.6 | 8.1 | 5.7 | 9-10 |
| Color | White | Tan | Off-White | White | Off-White | Grey | White | White |
| Size range (cm) | 0.1100 | 0.1-1000 | 0.01-44 | 25-600 | 0.1-100 | 0.005-1 | | 0.1-50 |
| Mean size (cm) | 16 | 5.5 | 3 | 500 | 5 | .25 | | |

As mentioned, in one aspect of the invention it is a goal to use as a high of a percentage recovered (recycled) materials as possible. These can be post-industrial, such as fly ash (Class F), silica fume, ground granulated blast furnace slag, or post-consumer, such as recycled glass pozzolan, recycled glass 'sand' and recycled glass aggregate. Some pozzolans and fillers are non-virgin, such as metakaolin, wollastonite, fumed white silica, colloidal silica, micro silica, amorphous silica and microcrystalline silica.

DETAILED DESCRIPTION OF THE PREFERRED EMBODIMENTS

Figure 1:
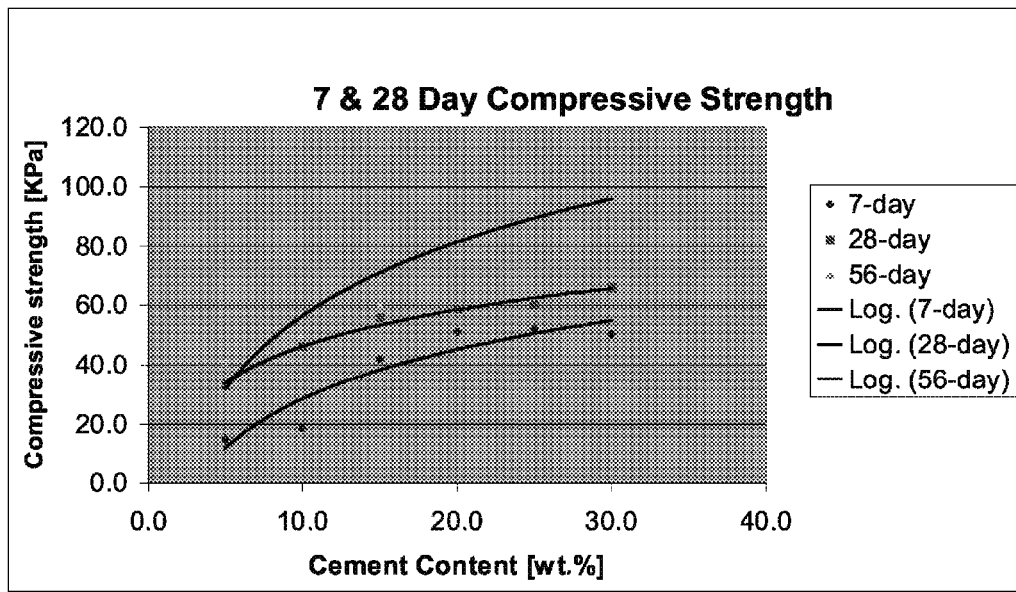
FIGS. 1-4 are graphs showing the compressive strength, bulk density, porosity, hydraulic absorption and cement efficiency for a series of mixes having specified component proportions.

Recycled glass can be incorporated into concrete in the form of four distinct size distributions to provide four distinct functions within the concrete. Recycled glass can be finely ground to a mean particle size of about 16 microns, which is similar to ordinary Portland cement (OPC), and activated with alkali to provide cementitious properties on par with OPC. Un-activated at the same particle size recycled glass can be an extremely effective pozzolan that reduces the system pH while increasing the aggregate bond strength. Recycled glass employed at a mean particle size of around 250-600 microns can be an effective filler that will increase strength, while lowering hydraulic permeability and porosity. At the size of fine or coarse aggregate, recycled glass can replace conventional aggregate (sand and gravel), while having the unique advantage of zero absorption.

While the present invention preferably incorporates, but does not require, recycled content, the essential materials for the composition are cement, suitably OPC or white cement, pozzolans, and fine and coarse glass aggregate. Suitable pozzolans are fly ash, silica fume, ground granulated blast furnace slag (GGBFS), metakaolin, wollastonite, amorphous silica, micro silica and finely divided glass powders. A nonform product can be optimized when the pozzolan plus filler-cement ratio is in the range 0.25 to 4, and is preferably greater than unity. The cement content can range between about 3% to about 20% by weight, however, the preferred range is from about 5% to 10%. The resulting product is characterized by high compressive and tensile strength, high density, low hydraulic permeability, low porosity and moderate pH, high thermal shock resistance, and controllable brightness coefficient, all achievable with a high recycled content.

A mixture of following primary pozzolans have been identified as being suitable for the composition of the invention, with their content ranges (by weight) indicated:

Metakaolin—0.5% to 10%, with a preferred range of 1.5% to 2.5%

Wollastonite—0.5% to 10%, with a preferred range of 1.5% to 3.0%

Micro silica—0.25% to 5.0%, with a preferred range of 0.25% to 5.0%

Total glass pozzolans—5% to 20%, with a preferred range of 10% to 15%

The total glass pozzolans are preferably a mixture of 100 mesh glass pozzolans, 120 mesh glass pozzolans and 300 mesh glass pozzolans, each of which is in the following content ranges: 0 to 20%, with a preferred range of 5% to 12.5%.

Fly ash, silica fume, GGBFS and amorphous silica, can be selectively added to achieve desired properties, such as a desired pigmentation or color. The following are suitable content ranges for these additional pozzolans:

Fly ash—0.5% to 15%, with a preferred range of 1.5% to 5%

Silica fume—0.5% to 10%, with a preferred range of 1.5% to 5%

GGBFS—0.5% to 15%, with a preferred range of 1.5% to 7.5%

Amorphous silica—0.5% to 5%, with a preferred range of 1.5% to 3%

When used, the silica based filler can be any finely divided form of crystalline silica less than 100 microns in size. Silica flour is suitably used as a filler and is suitably present in a range of 0 to 10% by weight, and preferably in the range of 0 to 5%.

It is noted that the fine glass aggregate used in the composition is suitably a 12 mesh glass aggregate, but is not limited to this size. Generally, fine aggregate is considered to have a size finer than a No. 4 screen (4.75 mm). The fine aggregate should not have fines less than about 150 microns (100 mesh), which can be screened out.

Laboratory scale compositional studies of the composition of the invention were made, and selected formulas were used to produce 9'×5'×3 cm thick panels. The mixing and forming procedure was different for samples and panels.

To a base composition of OPC (Type I), glass sand (12 Mesh plate glass), glass aggregate (⅝ minus cobalt blue vodka bottles), and pozzolans were added to mix water that contained ADVA-100, a high-range water-reducer (HRWR) manufactured by W.R. Grace.

For laboratory scale samples the cement and pozzolans were pre-mixed for several minutes. A portion of the mixing water and HRWR was added to the pre-mixed powders. A dough-like body was developed. The remainder of the mixing water and HRWR was added to produce a fluid cement. The 12 Mesh was added to produce a mortar. Finally the glass aggregate was added. The mixture was mixed by hand and placed into molds measuring 2"×2"×2" for compression strength testing and molds measuring 2"×2"×8" for testing flexural strength, density, porosity and hydraulic permeability. Samples were vibrated for 5 minutes to consolidate the mix. Molds were stored in air for 24 hours and then wet cured for 6 days at ambient temperature. An independent laboratory was used for compression and flexural strength testing. Density, porosity, and hydraulic absorption measurements were performed in-house using ASTM test method C642. Color and brightness was noted, but is subjective.

For manufacturing panels the cement, pozzolans and 12 mesh glass were pre-mixed for 15 minutes in a barrel tumbler. In a ⅙ cubic yard cement mixer, a portion of the mixing water, latex and HRWR was added to the pre-mixed powders. A dough-like body was developed. The remainder of the mixing water and HRWR was added to produce fluid cement. Finally, the glass aggregate was added. Optionally a colloidal silica, such as Cembinder 8, manufactured by Eka Chemicals, can be added as the last ingredient. The batch is mixed for an additional 10-15 minutes. The mixture was discharged into pan molds measuring 9'×5'×3 cm. Samples for strength testing were cast into 2" diameter by 4" long molds for compression testing, and molds measuring 2"×2"×8" for testing flexural strength, density, porosity and hydraulic permeability. Samples were vibrated for 15 minutes to consolidate the mix. Panels and samples were stored in air for 24 hours, mist cured for 3 days and then steam cured for 15 hours. An independent laboratory was used for compression and flexural strength testing. Density, porosity, and hydraulic absorption measurements were performed in-house using ASTM test method C642. Color and brightness was noted, but is subjective.

Table III shows the compressive strength, density, porosity and hydraulic absorption as a function of pozzolans substitution at 1.0, 2.0 and 4.0 wt %. The pozzolans were substituted for the white cement. White cement was used rather OPC to control color.

TABLE III

Compositions and results for simple pozzolan for cement substitution for metakaolin, silica flour, silica fume, GGBFS, fly ash and glass pozzolan.

| Mix Number | 181 | 182 | 183 | 184 | 186 | 187 | 188 | 511 | 512 | 513 |
|---|---|---|---|---|---|---|---|---|---|---|
| White cement | 20 | 19 | 18 | 16 | 19 | 18 | 16 | | | |
| Metakaolin | | 1 | 2 | 4 | | | | | | |
| Silica Flour | | | | | 1 | 2 | 4 | | | |
| Silica Fume | | | | | | | | 1 | 2 | 4 |
| GGBFS | | | | | | | | | | |
| Fly Ash | | | | | | | | | | |
| Glass Pozzolan | | | | | | | | | | |
| 12 Mesh Glass | 25 | 25 | 25 | 25 | 25 | 25 | 25 | 25 | 25 | 25 |
| ⅝ minus Glass Aggregate | 55 | 55 | 55 | 55 | 55 | 55 | 55 | 55 | 55 | 55 |
| [W/(Cm + P)] | .30 | .25 | .25 | .25 | .25 | .25 | .25 | .25 | .25 | .25 |
| $f_c^7$ [Mpa] | 26 | 28 | 27 | 24 | 27 | 27 | 27 | 38 | 44 | 53 |
| $f_c^{28}$ [Mpa] | 26 | 51 | 45 | 39 | 38 | 46 | 49 | 50 | 57 | 63 |
| Density [g/cm³] | 2.295 | 2.363 | 2.369 | 2.356 | 2.354 | 2.352 | 2.352 | 2.360 | 2.368 | 2.370 |
| Porosity [%] | 5.8 | 2.3 | 2.1 | 1.9 | 3.2 | 2.6 | 2.4 | 2.8 | 2.3 | 1.9 |
| Absorption [%] | 2.5 | .97 | .86 | .81 | 1.4 | 1.1 | 1.0 | 1.0 | 0.85 | 0.77 |

| Mix Number | 516 | 517 | 518 | 521 | 522 | 523 | 526 | 527 | 528 |
|---|---|---|---|---|---|---|---|---|---|
| White cement | 19 | 18 | 16 | 19 | 18 | 16 | 19 | 18 | 16 |
| Metakaolin | | | | | | | | | |
| Silica Flour | | | | | | | | | |
| Silica Fume | | | | | | | | | |
| GGBFS | 1 | 2 | 4 | | | | | | |
| Fly Ash | | | | 1 | 2 | 4 | | | |
| Glass Pozzolan | | | | | | | 1 | 2 | 4 |
| 12 Mesh Glass | 25 | 25 | 25 | 25 | 25 | 25 | 25 | 25 | 25 |
| ⅝ minus Glass Aggregate | 55 | 55 | 55 | 55 | 55 | 55 | 55 | 55 | 55 |
| [W/(Cm + P)] | .25 | .25 | .25 | .25 | .25 | .25 | .25 | .25 | .25 |
| $f_c^7$ [Mpa] | 28 | 31 | 59 | 24 | 24 | 22 | 26 | 27 | 28 |
| $f_c^{28}$ [Mpa] | 41 | 51 | 65 | 29 | 32 | 33 | 40 | 47 | 52 |
| Density [g/cm³] | 2.325 | 2.343 | 2.364 | 2.300 | 2.312 | 2.332 | 2.335 | 2.353 | 2.368 |
| Porosity [%] | 2.2 | 2.0 | 1.8 | 2.7 | 2.3 | 2.1 | 2.3 | 2.1 | 2.0 |
| Absorption [%] | 1.2 | .95 | .88 | 1.8 | 1.4 | 1.3 | 1.1 | .91 | .80 |

Using the results from Table III mixes were designed that incorporate a mixture of pozzolans and micro-silica fillers. To this end, mixtures of pozzolans, micro-silica fillers, glass sand and glass aggregate were combined with mixing water, a high range water reducer, vinegar (CH3COOH), a set accelerator, and optionally an acrylic modifier. The compositions with high pozzolan to cement ratios (P/Cm), tended towards optimization of the desired mechanical, chemical and thermal properties.

Specifically, certain component ranges were discovered for a cementitious composition with high glass content that yields the combination of desired mechanical, chemical and thermal properties for a solid surface panel, namely: about 5% to 20% by weight of ordinary Portland cement, pozzolan totaling about 5% to 20% by weight, such that the pozzolan/cement ratio is in a range of about 0.25-4, giving a cement plus pozzolan total of 10% to 50% by weight, with the recycled component being 60% to 95% by weight, and the glass component (preferably recycled), comprised of finely ground glass powders (glass pozzolan), glass "sand" (fine glass aggregate) and coarse glass aggregate, being about 60% to 90% by weight. The remaining pozzolans are selected from the group consisting of fly ash, metakaolin, wollastonite, ground granulated blast furnace slag, silica fume, and micro silica, such that the brightness is controllable, and such that the 28-day compressive strength is greater than 40 KPa, the flexural strength is greater than 7.5 KPa, the porosity is less than 2%, and the absorptivity is less than 1.5%.

A preferred range for cement contents and pozzolan contents has been identified for best results. The preferred content ranges for the cementitious composition are 5-15 wt. % cement, pozzolan totaling 5-15%, such that the pozzolan/cement ratio is 1.0-2.5 giving a cement plus pozzolan total of 12.5-30%, with the recycled component being 75-95 wt. %, and the glass component (preferably recycled), comprised of glass pozzolan, glass "sand" and glass "aggregate", being 75-90%. The remaining pozzolans are selected from the set of fly ash, metakaolin, wollastonite, ground granulated blast furnace slag, silica fume, colloidal silica and micro silica such that the brightness is controllable.

EXAMPLES

Example 1

A 3000 g batch was prepared by pre-mixing for 15 minutes 300.0 g type I white Portland cement, 60.0 g metakaolin, 80.0 g NYAD-G wollastonite, 80.0 g grey silica fume, 80.0 g Minusil-5 silica flour, and 375.0 g 100 mesh plate glass pozzolan. To 154.5 g of $H_2O$ was added 7.5 g 5% aqueous solution of $CH_3COOH$, 15.0 g Acryly-60 acrylic modifier, and 33.62 g ADVA-100 high-range water-reducer. The two were combined to form a dough. To this dough 375.0 g 12 mesh glass sand was added. After mixing, 6.2 g Polarset set accelerator was added. After thoroughly mixing, 1,650.0 g of ⅝" minus cobalt blue crushed Skyy vodka bottles was added and thoroughly mixed. The mixture was placed into molds and vibrated for 5 minutes. The mix was highly thixotropic, with bubbles rising easily from the mix during vibration. The molds were left to air cure for 24 hours after which they were moist cured for 6 days for the 7-day compressive strength measurement, moist cured for 27 days for the 28-day compressive strength measurement, and moist cured for 27 days followed by 28 days of air drying for the 56-day compressive strength measurements. For density, hydraulic absorption and porosity measurements a 1,200 g rectangular sample was oven dried for 48 hours, weighed, submerged in water for 48 hours, weighed, boiled for 12 hours, weighed, and using Archimedes method, the weight suspended in water was measured. The composition and results are given for example 1 in Table IV as mix No. 460. The high pozzolan to cement ratio of this mix creates a concrete with very low porosity (1.4%), and hydraulic absorption (0.62%), which is reflected in the high compressive strength (77 Mpa). The 28-day compressive strength of mix No. 211 is comparable to 460, but obtains this strength by having high cement content. Also note that the resulting concrete has a 3-fold increase in porosity and a 3-fold increase in absorption relative to 460.

Table IV presents a series of formulations that incorporate a mixture of pozzolans. The pozzolan/cement ratio ranges between 0.16 and 2.25. Mixes 211, 225 and 231 have the pozzolans metakaolin and silica flour fixed at 2.0 wt % each, with the cement content being 25.0, 20.0 and 15.0, respectively. In this series the density decreases while the porosity and absorption increase. The water to cement ratio, [W/Cm], also increased in this series and is probably responsible for the deterioration of the material properties. Comparing mixes 231 and 190 illustrate this point. The mixes have nearly identical compositions but very different water to cement ratios [W/C]. The 28-day strength, porosity and absorption are dramatically improved.

TABLE IV

A series of formulations that incorporate a mixture of pozzolans.

| | Example No. | | | | | |
|---|---|---|---|---|---|---|
| Mix Number | n/a 211 | n/a 225 | n/a 231 | n/a 190 | n/a 194 | n/a 191 |
| White cement | 25 | 20 | 15 | 16 | 14 | 12 |
| Metakaolin | 2 | 2 | 2 | 2 | 6 | 4 |
| Wollastonite | | | | | | |
| Silica Flour | 2 | 2 | 2 | 2 | 4 | 4 |
| Silica Fume | | | | | | |
| GGBFS | | | | | | |
| Fly Ash | | | | | | |
| Glass Pozzolan | | | | | | |
| 12 Mesh Glass | 25 | 25 | 25 | 25 | 25 | 25 |
| ⅝ minus Glass Aggregate | 46 | 51 | 56 | 55 | 51 | 55 |
| HRWR | 1.25 | 1.00 | 0.75 | 0.80 | 0.70 | 0.60 |
| [W/C + P] | .25 | .28 | .33 | .25 | .28 | .25 |
| [P/Cm] | 0.16 | 0.20 | 0.27 | 0.25 | 0.71 | 0.67 |
| Recycled Content | 71.0 | 76.0 | 81.0 | 80.0 | 76.0 | 80.0 |

TABLE IV-continued

A series of formulations that incorporate a mixture of pozzolans.

| $f_c^7$ [Mpa] | 44.7 | 38.3 | 38.2 | 27.4 | 29.5 | 24.8 |
|---|---|---|---|---|---|---|
| $f_c^{28}$ [Mpa] | 76.5 | 64.1 | 39.8 | 59.2 | 66.3 | 53.0 |
| Density [g/cm³] | 2.346 | 2.323 | 2.326 | 2.384 | 2.342 | 2.376 |
| Porosity [%] | 3.9 | 4.4 | 5.0 | 1.7 | 1.5 | 1.1 |
| Absorption [%] | 1.67 | 1.91 | 2.16 | 0.69 | 0.65 | 0.46 |

| | Example No. | | | | | | |
|---|---|---|---|---|---|---|---|
| | n/a | n/a | n/a | n/a | n/a | n/a | 1 |
| Mix Number | 451 | 454 | 342 | 455 | 463 | 466 | 460 |
| White cement | 5 | 10 | 10 | 10 | 10 | 10 | 10 |
| Metakaolin | 1 | 1 | 2 | 2 | 1 | 1 | 2 |
| Wollastonite | 1.33 | 4 | 2.67 | 2.67 | 2.5 | 2.5 | 2.67 |
| Silica Flour | 1.33 | 4 | 2.67 | 2.67 | | | 2.67 |
| Silica Fume | 1.33 | 1 | 2.67 | 2.67 | | | 2.67 |
| GGBFS | | | | | 5 | 10 | |
| Fly Ash | | | | | | | |
| Glass Pozzolan | | | | 6.25 | 12.5 | 7.5 | 12.5 |
| 12 Mesh Glass | 25 | 25 | 25 | 18.75 | 12.5 | 12.5 | 12.5 |
| ⅝ minus Glass Aggregate | 65 | 55 | 55 | 55 | 56.5 | 56.5 | 55 |
| HRWR | 0.25 | 0.50 | 0.50 | 0.56 | 0.22 | 0.20 | 0.74 |
| [W/C + P] | .64 | .38 | .26 | .31 | 0.4 | 0.31 | .40 |
| [P/Cm] | 1.00 | 1.00 | 1.00 | 1.63 | 2.1 | 2.1 | 2.25 |
| Recycled Content | 91.3 | 81.0 | 82.7 | 82.7 | 86.5 | 86.5 | 82.7 |
| $f_c^7$ [Mpa] | 22.2 | 37.0 | 41.1 | 40.8 | 23.2 | 35.4 | 32.8 |
| $f_c^{28}$ [Mpa] | 40.4 | 50.3 | 46.3 | 46.7 | 70.3 | 74.1 | 77.0 |
| Density [g/cm³] | 2.291 | 2.300 | 2.353 | 2.330 | 2.360 | 2.354 | 2.270 |
| Porosity [%] | 3.4 | 1.0 | 1.2 | 0.6 | 0.5 | 0.4 | 1.4 |
| Absorption [%] | 1.51 | 0.45 | 0.53 | 0.27 | 0.33 | 0.28 | 0.62 |

[P/Cm] ranges between 0.16 and 2.25. The compositions are given in wt. %.

Mixes 342, 455 and 460 illustrate the role of the glass pozzolan. There is an increased water demand as 12 Mesh glass is replaced by 100 Mesh glass pozzolan, but the resulting 28-day compressive strength is greatly enhanced. The porosity and absorption, which are already excellent, are also improved.

Table V below examines mixes with low cement content and with very high [P/Cm], and particularly for a series of formulations that incorporate a mixture of pozzolans, with the [P/Cm] range being between 1.85 and 3.45. The compositions are given in wt. %. The HRWR is given as weight percent solids content.

TABLE V

| Mix No. | 460 | 461 | 462 | 463 | 464 | 465 | 466 |
|---|---|---|---|---|---|---|---|
| White cement | 10 | 5 | 7.5 | 10 | 5 | 7.5 | 10 |
| Metakaolin | 2 | 1 | 1 | 1 | 1 | 1 | 1 |
| Wollastonite | 2.67 | 1.25 | 1.875 | 2.5 | 1.25 | 1.875 | 2.5 |
| Silica Flour | 2.67 | | | | | | |
| Silica Fume | 2.67 | | | | | | |
| GGBFS | | 2.5 | 3.75 | 5 | 5 | 7.5 | 10 |
| Glass Pozzolan | 12.5 | 12.5 | 12.5 | 12.5 | 10 | 8.75 | 7.5 |
| 12⁻/100⁺ Mesh | 12.5 | 12.5 | 12.5 | 12.5 | 12.5 | 12.5 | 12.5 |
| ⅝ minus Aggregate | 55 | 65.25 | 60.875 | 56.5 | 65.25 | 60.875 | 56.5 |
| HRWR | 0.74 | .11 | .15 | .22 | .11 | .15 | .20 |
| [W/C + P] | 0.40 | .5 | .465 | .4 | .4 | .35 | .306 |
| [P/Cm] | 2.25 | 3.45 | 2.55 | 2.1 | 3.45 | 2.55 | 2.1 |
| Recycled Content | 82.7 | 93.75 | 90.63 | 87.5 | 93.75 | 90.63 | 87.5 |
| $f_c^7$ [Mpa] | 32.8 | 22.5 | 33.6 | 23.2 | 23.3 | 25.4 | 33.2 |
| $f_c^{28}$ [Mpa] | 77.0 | 50.8 | 54.3 | 70.3 | 51.0 | 51.3 | 74.1 |
| Mix Number | 467 | 468 | 469 | 471 | 472 | 473 | 474 |
| White cement | 5 | 5 | 10 | 5 | 7.5 | 10 | 10 |
| Metakaolin | 1 | 1 | 1 | 1 | 1 | 1 | 1 |
| Wollastonite | 1.25 | 1.875 | 2.5 | 1.25 | 1.875 | 2.5 | 2.5 |
| Silica Flour | 2.5 | 3.75 | 5 | | | | |
| Silica Fume | | | | | | | |
| GGBFS | 5 | 7.5 | 10 | 5 | 11.25 | 15 | 12.5 |
| Glass Pozzolan | 7.5 | 5 | 2.5 | 5 | 5 | 2.5 | 2.5 |
| 12⁻/100⁺ Mesh | 12.5 | 12.5 | 12.5 | 12.5 | 12.5 | 12.5 | 12.5 |
| ⅝ minus Aggregate | 65.25 | 60.875 | 56.5 | 70.25 | 60.875 | 56.5 | 59 |
| HRWR | .11 | .15 | .20 | .11 | .15 | .22 | .20 |

TABLE V-continued

| [W/C + P] | .249 | .238 | .4 | .334 | .227 | .231 | .261 |
|---|---|---|---|---|---|---|---|
| [P/Cm] | 3.45 | 2.55 | 2.1 | 2.45 | 2.55 | 2.1 | 1.85 |
| Recycled Content | 91.25 | 86.88 | 82.5 | 93.75 | 90.63 | 87.5 | 87.5 |
| $f_c^7$ [Mpa] | 28.7 | 30.0 | 38.0 | 23.9 | 28.6 | 21.4 | 23.3 |
| $f_c^{28}$ [Mpa] | 51.8 | 48.8 | 68.6 | 46.7 | 49.6 | 62.5 | 63.6 |

Table V illustrates that mixes with very high P/Cm can be formulated with high recycled content. The preliminary results indicate high strength concretes can be formulated with 5-10 wt % white cement, if the P/Cm is kept sufficiently high. These mixes are highly thixotropic and are characterized by no bleeding and low apparent porosity. These mixes have recycled content between 82.7-93.75 weight percent.

Figure 2:
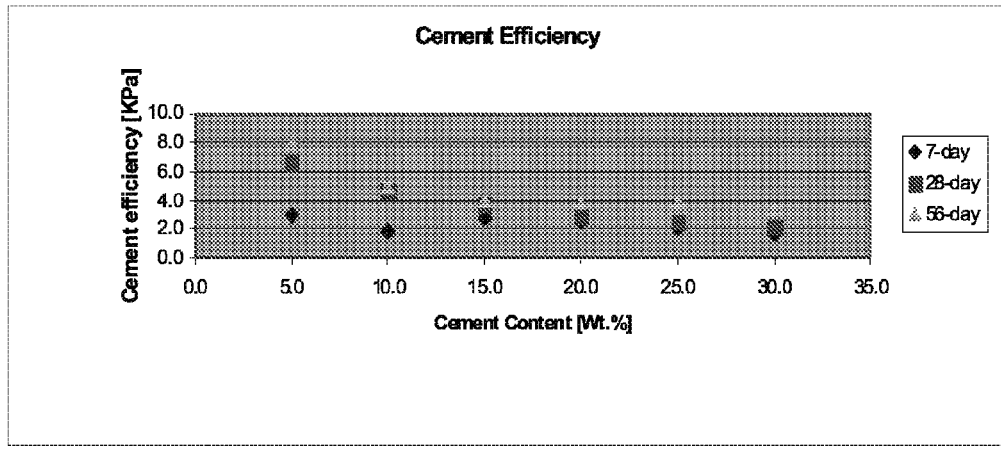
Figure 3:
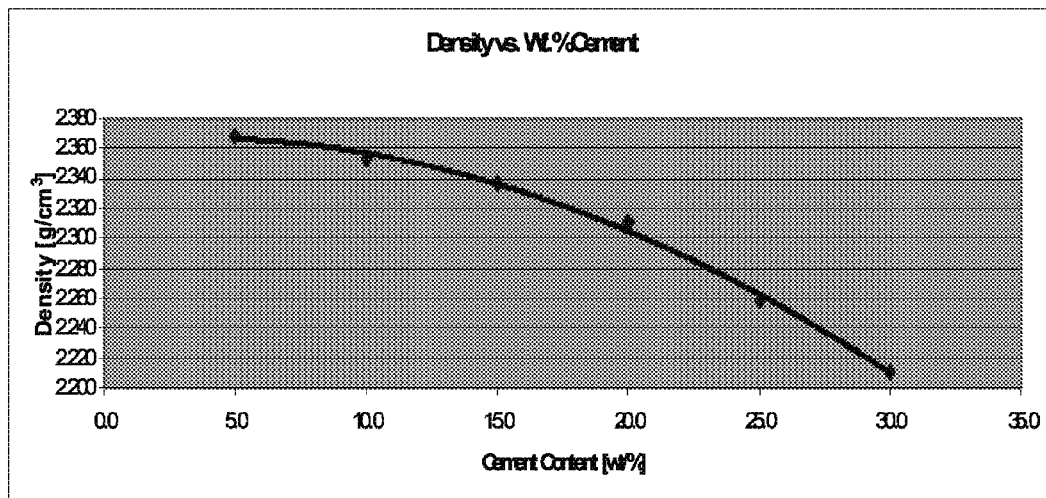
Figure 4:
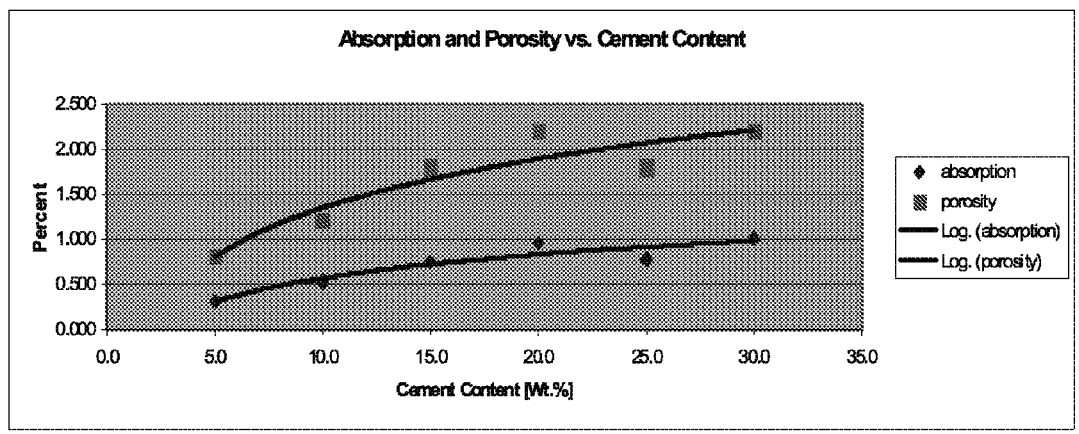

FIGS. 1-4 show the compressive strength, bulk density, porosity, hydraulic absorption and cement efficiency for a series of mixes wherein the following proportions are kept. The pozzolan-cement ratio, [P/Cm] was kept equal to unity. The 12 Mesh glass was kept equal to 25.0 wt %. The pozzolans were a mix of metakaolin (MK), wollastonite (WO), silica fume(SF) and micro-silica flour (MS), kept at the following fixed ratio: MK:WO:SF:MS=0.2:0.267:0.267:0.267.

Example 2

A 740 lb batch was prepared by pre-mixing for 15 minutes 94 lbs type I white Portland cement, 13 lbs metakaolin, 13 lbs NYAD-G wollastonite, 13 lbs metakaolin, 13 lbs fly ash, 23 lbs 120 mesh plate glass, 30 lbs 100 mesh plate glass, and 94 lbs 12 mesh plate glass. This was added to a solution consisting of 46 lbs of $H_2O$, 7.5 lbs of Acryl-60, 6.6 lbs of Adva-100. After 15 minutes of mixing 448 lbs of 5'8" minus recycled glass aggregate was added and mixed to a uniform consistency. 19 lbs of Cembinder-8 was slowly added and the mixing continued for 10 minutes. The mixture was placed into a 9'×5'×3 cm pan mold and vibrated for 15 minutes. The mix was highly thixotropic, with bubbles rising easily from the mix during vibration. Test samples measuring 2" diameter by 6" length, and 2"×2"×8" were also made. The molds were left to air cure for 24 hours after which they were mist cured for 3 days and steam cured for 15 hours. The panels were ground and polished on one face to 3500 grit finish exposing the glass aggregate. The test samples followed the same cure cycle, and were used for the compressive strength, tensile strength, density, hydraulic absorption and porosity measurements.

Example 3

A 740 lb batch was prepared by pre-mixing for 15 minutes 94 lbs type I white Portland cement, 15 lbs metakaolin, 15 lbs NYAD-G wollastonite, 15 lbs metakaolin, 15 lbs fly ash, 37 lbs 300 mesh plate glass, 22 lbs 120 mesh plate glass, 15 lbs 100 mesh plate glass, and 111 lbs 12 mesh plate glass. This was added to a solution consisting of 25.0 lbs of $H_2O$, 22.2 lbs of Acryl-60, 6.9 lbs of Adva-100 and 3.7 lbs Orisil-200. After 15 minutes of mixing 410 lbs of 5'8" minus recycled glass aggregate was added and mixed to a uniform consistency. The mixture was placed into a 9'×5'×3 cm pan mold and vibrated for 15 minutes. The mix was highly thixotropic, with bubbles rising easily from the mix during vibration. Test samples measuring 2" diameter by 6" length, and 2"×2"×8" were also made. The molds were left to air cure for 24 hours after which they were mist cured for 3 days and steamed cured for 15 hours. The panels were ground and polished on one face to 3500 grit finish exposing the glass aggregate. The test samples followed the same cure cycle, and were used for the compressive strength, tensile strength, density, hydraulic absorption and porosity measurements.

Table VI gives compositions for a series of mixes using Cembinder-8 and Orisil-200 as the micro silica source.

TABLE VI

A series of formulations that incorporate a mixture of pozzolans and latex.

| | Example No. | | | | | | | |
|---|---|---|---|---|---|---|---|---|
| Mix No. | 2<br>801 | n/a<br>802 | n/a<br>803 | n/a<br>804 | n/a<br>805 | n/a<br>806 | n/a<br>807 | n/a<br>808 |
| White cement | 12.7 | 12.7 | 14.4 | 12.7 | 12.7 | 12.7 | 12.7 | 15.0 |
| Metakaolin | 1.7 | 1.7 | | 1.7 | 1.7 | 1.7 | 1.7 | 2 |
| Wollastonite | 2.5 | 2.5 | 2.5 | 1.7 | 2.5 | 2.5 | 1.7 | 2 |
| Fly Ash | | 1.7 | | 1.7 | 1.7 | 1.7 | 1.7 | |
| Orisil 200 | | | | | | | | |
| 40° Be' $Na_2SiO_3$ | | | | | | | | |
| Acryl 60 (Dry weight) | 0.5 | 0.5 | 0.5 | 1.0 | 1.0 | 1.0 | 1.0 | 1.0 |
| Cembinder 8 (Dry weight) | 1.3 | 1.3 | 1.3 | 0.7 | | | | |
| 300 Mesh | | | | | | | | |
| 120 Mesh | | | | | | | | |
| 100 Mesh | 12.7 | 12.7 | 12.7 | 7 | 12.7 | 8.4 | 7.0 | 7.5 |
| 12 Mesh | 8.4 | 8.4 | 8.4 | 18 | 8.4 | 12.7 | 18.0 | 17.5 |
| ⅝ minus Aggregate | 60.5 | 59.0 | 60.7 | 56.5 | 60.3 | 60.3 | 57.2 | 56.0 |
| HRWR (% Cm + MK + WO + FA) | 5.3 | 5.3 | 5.3 | 5.3 | 5.3 | 5.3 | 5.3 | 5.3 |
| [W/C + P] | 0.27 | 0.26 | 0.25 | 0.22 | 0.22 | 0.21 | 0.20 | 0.20 |
| [P/Cm] | 1.47 | 1.61 | 1.16 | 1.08 | 1.54 | 1.20 | 1.03 | 0.98 |
| Recycled Content | 81.6 | 81.8 | 81.8 | 83.2 | 83.1 | 83.1 | 83.9 | 81.0 |
| $f_c^4$ [Mpa] | 52.7 | 53.6 | 56.4 | 52.8 | 44.3 | 42.3 | 43.0 | 44.7 |

| | Example No. | | | | | | |
|---|---|---|---|---|---|---|---|
| Mix No. | n/a<br>809 | n/a<br>810 | n/a<br>811 | n/a<br>812 | n/a<br>813 | 3<br>814 | n/a<br>815 |
| White cement | 12.7 | 12.7 | 12.7 | 12.7 | 12.7 | 12.7 | 12.7 |
| Metakaolin | 1.7 | 1.7 | 2 | 2 | 2 | 2 | 2 |
| Wollastonite | 1.7 | 1.7 | 2 | 2 | 2 | 2 | 2 |
| Fly Ash | | | 2 | 2 | 2 | 2 | 2 |
| Orisil 200 | | | 0.25 | 0.5 | 0.5 | 0.5 | 1.0 |
| 40° Be' $Na_2SiO_3$ | | 0.5 | | | | | |
| Acryl 60 (Dry weight) | 1.5 | 1.2 | 1.0 | 1.5 | 1.5 | 1.5 | 1.5 |
| Cembinder 8 (Dry weight) | | | | | | | |
| 300 Mesh | | | | | 2.0 | 5.0 | |
| 120 Mesh | | 3.0 | 3.0 | 3.0 | 3.0 | 3.0 | 3.0 |
| 100 Mesh | 8.1 | 4.0 | 4.0 | 4.0 | 5.0 | 2.0 | 4.0 |
| 12 Mesh | 16.9 | 18.0 | 18.0 | 18.0 | 15.0 | 15.0 | 18.0 |
| ⅝ minus Aggregate | 59.0 | 59.0 | 56.0 | 55.8 | 55.8 | 55.8 | 55.3 |
| HRWR (% Cm + MK + WO + FA) | 5.3 | 5.3 | 5.0 | 5.0 | 5.0 | 5.0 | 5.0 |
| [W/C+P] | 0.20 | 0.19 | 0.19 | 0.18 | 0.18 | 0.17 | 0.19 |
| [P/Cm] | 1.02 | 0.90 | 1.12 | 1.18 | 1.42 | 1.42 | 1.46 |

TABLE VI-continued

A series of formulations that incorporate a mixture of pozzolans and latex.

| Recycled Content | 84.0 | 84.0 | 83.0 | 82.8 | 82.8 | 82.8 | 82.3 |
|---|---|---|---|---|---|---|---|
| $f_c^4$ [Mpa] | 46.0 | 40.3 | 48.6 | 45.6 | 42.8 | 42.2 | 32.6 |

The compositions are given in wt. %. The strength is measured after 4 days of cure, which corresponds to the panel production cure cycle.

Therefore, it can be seen that the present invention provides a composition for and method of producing a solid surface sheet-form building material with a high glass content that has excellent mechanical, thermal, and chemical properties, and that is particularly adapted to the use of a high recycled content. While the invention has been described in considerable detail in the foregoing description, it is not intended that the invention be limited to such detail, except as necessitated by the following claims.

What I claim is:

1. A cementitious composition for a sheet-form material having an exposed solid surface comprising cement, pozzolan, and aggregate glass, wherein said pozzolan is present at about 5% to about 20% by weight, said cement is present at about 3% to about 20% by weight, the pozzolan to cement ratio is between about 0.25 to 4, and the aggregate glass is at least about 60% by weight of the composition, and wherein the size of the aggregate glass is about equal to or greater than 12 mesh glass aggregate.

2. The composition of claim 1 wherein said cement is present at about 5% to about 20% by weight.

3. The composition of claim 1 wherein the pozzolan is comprised of at least one pozzolan selected from the group consisting of metakaolin, wollastonite, micro-silica and finely ground glass powder.

4. The composition of claim 1 wherein the pozzolan is comprised of metakaolin, wollastonite, micro-silica, and finely ground glass powder.

5. The composition of claim 3 wherein the pozzolan is comprised of at least one pozzolan selected from the group consisting of metakaolin, wollastonite, micro silica and finely ground glass powder, and at least one pozzolan selected from the group consisting of fly ash, silica fume, and ground granulated blast furnace slag.

6. The composition of claim 1 wherein the pozzolan is comprised of at least three pozzolans selected from the group consisting of fly ash, silica fume, ground granulated blast furnace slag, finely ground glass powder, metakaolin, wollastonite, and micro-silica.

7. The composition of claim 1 wherein the pozzolan is comprised of finely ground glass powder selected from the group consisting of 100 mesh, 120 mesh, and 300 mesh glass powder.

8. The composition of claim 1 wherein the pozzolan is comprised of a mixture of 100 mesh, 120 mesh, and 300 mesh finely ground glass powder.

9. The composition of claim 1 wherein the aggregate glass is comprised of fine and coarse aggregate glass.

10. The composition of claim 9 wherein at least one of the fine and coarse aggregate glass is provided in the form of recycled glass.

11. The composition of claim 1 wherein said aggregate glass is provided in the form of recycled glass.

12. The composition of claim 1 wherein the pozzolan includes glass pozzolans, and wherein the glass pozzolans and the aggregate glass component combined are present at about 60% to about 90% by weight.

13. The composition of claim 12 wherein the glass pozzolans and aggregate glass are provided from recycled material.

14. The composition of claim 1 further comprising a silica-based filler component, wherein the ratio of silica-based filler to cement is in the range of about 0.25 to 4.

15. The composition of claim 1 further comprising an acrylic present in an amount equal to or less than about 2% by dry weight.

16. The composition of claim 1 wherein the cement comprises ordinary Portland cement (OPC) selected from the group consisting of Type I OPC and Type III OPC.

17. A cementitious composition for a sheet-form material having an exposed solid surface comprising
   cement,
   pozzolan comprising at least one pozzolan selected from the group consisting of metakaolin, wollastonite, micro-silica and finely ground glass powder, said finely ground glass powder being made from recycled glass, and
   aggregate glass comprised of recycled fine and coarse aggregate glass, the size of the fine aggregate glass being about or less than 12 mesh glass aggregate,
   the cement being present at about 5% to about 20% by weight, and the pozzolan to cement ratio being from about 0.25 to about 1, and wherein the aggregate glass and finely ground glass powder constitute at least about 60% by weight of the composition.

18. A cementitious composition for a sheet-form material having an exposed solid surface comprising
   ordinary Portland cement (OPC) selected from the group consisting of Type I OPC and Type III OPC,
   pozzolan comprising finely ground glass powder selected from the group consisting of 100 mesh, 120 mesh and 300 mesh glass powder, and
   aggregate glass comprised of fine and coarse aggregate glass,
   the OPC being present at about 3% to about 20% by weight, and the pozzolan to cement ratio being between about 0.25 to 4, and wherein the aggregate glass and finely ground glass powder combined are at least about 60% by weight of the composition.

19. The composition of claim 18 wherein the finely ground glass powder and the aggregate glass are provided from recycled glass materials.

20. The cementitious composition according to claim 18 further comprising at least one other pozzolan selected from the group consisting of metakaolin, wollastonite, and micro-silica.

21. The cementitious composition according to claim 1 wherein the pozzolan to OPC ratio between about 0.16 to 2.25.

22. The cementitious composition according to claim 17 wherein the pozzolan to OPC ratio between about 0.16 to 2.25.

23. The cementitious composition according to claim 18 wherein the pozzolan to OPC ratio between about 0.16 to 2.25.

24. A cementitious composition comprising:
   (a) about 3% to about 20% ordinary Portland cement (OPC);
   (b) about 5% to about 20% by weight pozzolan, with the pozzolan to cement ratio between about 0.25:1 to 4:1; and
   (c) fine and/or course glass aggregate, which is at least 60% by weight of the composition with a majority of the glass aggregate about equal to or greater than 12 mesh.

* * * * *